United States Patent Office 3,148,211
Patented Sept. 8, 1964

3,148,211
ARYLALKYL HYDANTOALDEHYDE,
DIALKYLACETALS
Raymond W. Luckenbaugh, Wilmington, Del., assignor to E. I. du Pont de Nemours and Company, Wilmington, Del., a corporation of Delaware
No Drawing. Original application Oct. 13, 1960, Ser. No. 62,341, now Patent No. 3,133,079, dated May 12, 1964. Divided and this application July 16, 1963, Ser. No. 295,544
4 Claims. (Cl. 260—553)

This invention relates to herbicidal compositions and methods. More particularly this invention relates to phenyl and substituted phenyl alkyl imidazolinones, their intermediates and to their use in herbicidal compositions and methods.

The phenyl and substituted phenyl alkyl imidazolinones which can be used in the herbicidal compositions and methods of this invention have the general formula:

(1)

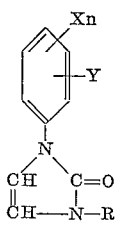

where

X is hydrogen or halogen.

Y is hydrogen, halogen, alkyl of less than 5 carbons, alkoxy of less than 5 carbons, nitro or cyano.

$n$ is a positive integer from 1 to 2 inclusive.

R is alkyl of less than 5 carbons.

While any of the above phenyl and substituted phenyl alkyl imidazolinones shown above can be used, it is prefered that X be hydrogen and halogen, Y be alkyl of less than 5 carbons, alkoxy of less than 5 carbons, halogen, nitro or cyano, and $n$ be as described above.

In the above Formula 1, it is most preferred that at least one X and Y be chlorine and R be methyl. Where there is one or more chlorines substituted on the phenyl ring, the most preferred compounds are those where there is a chlorine on the para position.

The intermediates, arylalkyl hydantoaldehyde, dialkylacetals, which can be used in the herbicidal compositions and methods of this invention have the general formula:

(2)

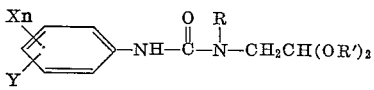

where X, Y, R and $n$ are as described for Formula 1 and R' is alkyl of less than 5 carbons.

While any of the intermediate compounds shown in Formula 2 can be used in herbicidal formulations and methods, it is preferred that X be halogen, R be methyl, Y be hydrogen, halogen, nitro or cyano, $n$ be as described for Formula 1, and R' be methyl or ethyl. It is most preferred that the halogen be chlorine.

The herbicidal compositions of this invention can also be formulated to contain other known herbicides in addition to the compounds of Formulas 1 and 2. Such known herbicides include:

2,3,6-trichlorobenzoic acid and salts thereof
2,3,5,6-tetrachlorobenzoic acid and salts thereof
2-methoxy-3,6-dichlorobenzoic acid
2-methoxy-3,5,6-trichlorobenzoic acid
2-chloro-N,N-diallylacetamide
N,N-dipropylthiolcarbamic acid, ethyl ester
2,2-dichloropropionic acid and salts thereof
Methylarsonic acid and salts thereof
Borates
Chlorates
Arsenates
Arsenites
Ammonium sulfamate
2,4-dichlorophenoxyacetic acid
2,4,5-trichlorophenoxyacetic acid
N-phenylcarbamic acid, isopropyl ester
N-(p-chlorophenyl)carbamic acid, isopropylester
Trichloroacetic acid
Maleic hydrazide
1,1-dimethyl-3-(3,4-dichlorophenyl)urea
1,1-dimethyl-3-(p-chlorophenyl)urea
1,1-dimethyl-3-phenylurea
1-n-butyl-1-methyl-3-(3,4-dichlorophenyl)urea
1-methoxy-1-methyl-3-(3,4-dichlorophenyl)urea
1-methoxy-1-methyl-3-(p-chlorophenyl)urea
1,1,3-trimethyl-3-(3,4-dichlorophenyl)urea
2-chloro-4,6-bis(ethylamino)-s-triazine
2-chloro-4-ethylamino-6-isopropylamino-s-triazine
2-chloro-4,6-bis(methoxypropylamino)-s-triazine
2-methoxy-4,6-bis(isopropylamino)-s-triazine
2,4-bis(isopropylamino)-6-methoxy-s-triazine
Dinitro-sec.-butylphenol
2,3,6-trichlorophenylacetic acid
5,6-dihydro-(4A,6A)-dipyrido-(1,2-A,2',1'-C)pyrazinium dibromide The mixed herbicidal compositions can contain between 10 and 90% of the compounds of this invention and between 90 and 10% of the known herbicides mentioned above based on the active compound.

The phenyl and substituted phenyl alkyl imidazolinones of this invention can be prepared in accordance with the following series of reactions. The symbols used are the same as those used in Formulas 1 and 2.

(3)

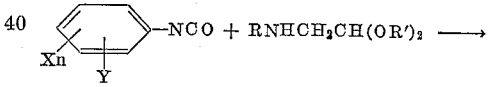

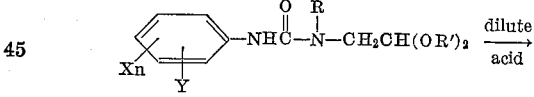

The phenyl and substituted phenyl isocyanates used as starting materials can be prepared by the general methods as described in the literature, for example Organic Syntheses II, p. 453, and Thompson U.S. Patent No. 2,689,861.

The general method of synthesis, and the physical properties of the N-alkylamino acetals, RNHCH$_2$CH(OR')$_2$, are described by R. G. Jones et al., J. Am. Chem. Soc. 71, 4000 (1949) and Kermack et al., J. Chem. Soc. 121, 1884 (1942).

While any dialkylacetal can be used in Equation 3, a diethylacetal or dimethylacetal are generally preferred because of their commercial availability.

The reactions of Equation 3 can be carried out by dissolving the phenyl or substituted phenyl isocyanate in an inert solvent such as benzene, toluene, xylene, dioxane, hexane, or ether, and then adding drop wise to the reaction mixture the N-alkylaminoacetal either alone or dissolved in the same type of solvent as used to dissolve the isocyanate.

This addition can also be accomplished by adding the phenyl or substituted phenyl isocyanate to the N-alkyl-amino acetal.

The reaction is exothermic. The temperature of reaction is not critical, but generally temperatures of 15–150° C. can be used. After completion of the reaction, the solvent is removed leaving the crude novel 5-phenyl or substituted phenyl-3-alkylhydantoaldehyde, dialkylacetal. Purification of this intermediate is not required either for its use as a herbicide or as an intermediate for phenyl imidazolinones.

These intermediates are generally low melting solids or viscous oils, which are soluble in most organic solvents such as acetone, alcohols, benzene, ether, dioxane, etc. They possess herbicidal activity and can be formulated into herbicidal compositions including wettable powders, pellets, granules and aqueous dispersions.

These crude intermediate oils or solids can be ring closed to the phenyl or substituted phenyl alkyl imidazolinones by heating in an aqueous acid medium to split out two moles of alcohol. Any aqueous acid medium can be used but the common aqueous acids such as hydrochloric acid, sulfuric acid, and phosphorous acid are preferred. The phenyl or substituted phenyl alkyl imidazolinones are then separated from the reaction mixture in any conventional manner such as filtration, if the product is solid, extraction with a solvent, etc.

In many examples in order to speed hydrolysis, ethanol can be added to the hydrolysis mixture to facilitate solubility of the hydantoaldehyde.

In some examples, the phenyl or substituted phenyl alkyl imidazolin-2-ones precipitate from the hydrolysis mixtures upon cooling. The determining factor in these examples is the water solubility of the imidazolin-2-ones. In other examples, the phenyl or substituted phenyl alkyl imidazolin-2-ones are sufficiently water soluble so that they are obtained as an aqueous solution. The pure product can be isolated in these examples, such as for 1-(p-chlorophenyl) - 3 - methylimidazolin - 2 - one and 1 - (p-methoxyphenyl)-3-methylimidazolin-2-one, by extraction from the aqueous solution with an organic solvent such as methylene dichloride, ethylene dichloride, chloroform, and benzene. Evaporation of the organic solvent yields the phenyl or substituted phenyl imidazolin-2-one.

Examples of the phenyl or substituted phenyl alkyl imidazolin-2-ones which precipitate from the hydrolysis mixture are 1-(3,4-dichlorophenyl)-3-methyl imidazolin-2-one, and 1-(p-nitrophenyl)-3-methyl imidazolin-2-one.

The phenyl or substituted phenyl alkyl imidazolin-2-ones of the present invention are crystalline solids generally of moderate melting points in the range of about 90–260° C. The lower melting products can in some cases be recrystallized from water. The higher melting products have low oil and water solubility. They possess herbicidal activity and can be formulated into herbicidal compositions including wettable powders, pellets, granules, and aqueous dispersions.

Herbicidal compositions of the present invention can be prepared by admixing one or more of the phenyl or substituted phenyl alkyl imidazolinones as described above with weed control adjuvants or modifiers. One or more of the novel intermediates the aryl alkyl hydantoaldehyde, dialkylacetals, can be admixed in herbicidal compositions. These herbicidal compositions can be in the form of wettable powders, granules, pellets and aqueous dispersions. A herbicidal composition containing both a phenyl or substituted phenyl alkyl imidazolinone and an aryl alkyl hydantoaldehyde, dialkylacetal can also be compounded into one of the above forms, the best one depending upon the physical properties of the mixed imidazolinone and hydanto dialkylacetal.

While the herbicidal compositions of this invention can be formulated in any conventional manner, it is much preferred that they be formulated in compositions which contain a wetting agent. They can additionally contain a finely divided inert solid.

The wetting agent can be a dispersant, a de-foamer or an emulsifying agent which will assist dispersion of the composition in water. Suitable wetting agents are set out, for example, in Searle U.S. Patent 2,426,417, Todd U.S. Patent 2,655,447, Jones U.S. Patent 2,412,510, or Lenher U.S. Patent 2,139,276. Other wetting, dispersing, and emulsifying agents such as those listed in detail in Bulletin E607 of the Bureau of Entomology and Plant Quarantine of the U.S. Department of Agriculture, and such as those set out in an article by McCutcheon in Chemical Industries, November 1947, page 811, entitled "Synthetic Detergents," can also be used.

Suitable wetting agents for use in compositions of this invention are alkyl and alkyl aryl polyether alcohols, polyoxyethylene sorbitol or sorbitan fatty acid esters, polyethylene glycol fatty esters and fatty alkylol amide condensates.

In general, less than 10% by weight of the wetting agent will be used in compositions of this invention and ordinarily the amount of the wetting agent will be less than 1% by weight. Usually, in accordance with customary practices, the amount will range from about 0.5 to 2% of a wetting agent.

Herbicidal compositions as described can, in addition to the wetting agent, contain a finely divided inert solid. The finely divided inert solid can be any of the powders commonly employed in the insecticide, herbicide and fungicide art and can include natural clays such as attapulgite and kaolinite clays, diatomacious earth, talcs, synthetic mineral fillers derived from silica and silicate such as synthetic fine silica and synthetic calcium or magnesium silicate, wood flour, and walnut shell flour.

The amount of the finely divided inert solid can vary widely and can range from 10 to 98% by weight of a herbicidal composition. The particle size can vary considerably but will ordinarily be somewhat under 50 microns in the finished formulation.

While formulations containing a wetting agent with or without an added finely divided inert solid are much preferred compositions of this invention, it will be used in the compositions of this invention by formulation in various conventional manners.

The imidazolinones and hydanto dialkylacetals of this invention can also be dissolved in appropriate nonphytotoxic organic solvents. A concentrate thus formed can be mixed with water, using a dispersing agent if one is necessary. Suitable solvents include lower molecular weight aromatic hydrocarbons, usually benzene, toluene, xylene and alkylated naphthalene, low molecular weight alcohols and esters, and water immiscible ketones.

Emulsifiable oils can be prepared in the same fashion using an oil in which the imidazolinone or dialkylacetal is soluble, such as diesel oil.

The herbicidal method of the present invention comprises applying a phenyl or substituted phenyl alkyl imidazolinone of Formula 1 or an aryl alkyl hydantoaldehyde, dialkylacetal of Formula 2, ordinarily in a herbicidal composition of the aforementioned type, to a locus or area to be protected from undesirable plant growth. The active compound is, of course, applied in an amount sufficient to exert the desired herbicidal action. The application can be made directly upon the locus or area and the vegetation thereon during the period of infestation, or, alternatively, the application can be made in advance of an anticipated weed infestation.

These phenyl or substituted phenyl alkyl imidazolin-2-ones and aryl alkyl hydantoaldehyde, dialkylacetals can be used for pre-emergence weed control in crops such as cotton, soybean, sugar cane, safflower, and asparagus at rates of 0.5 to 3.0 pounds per acre. They give weed control in the aforementioned crops when applied as a directed post-emergence spray at rates of about 0.5 to 2.0 pounds per acre (active) to weed seedlings growing near the crops.

Complete kill of vegetation is possible for an extended period of time when the compounds are applied at a rate of about 10 to 30 pounds per acre.

As will be shown in the examples and as shown generally above, the imidazolinones and their intermediates, the aryl alkyl hydantoaldehyde, dialkylacetals are effective for the control of coniferous brush, and give excellent control of weeds such as foxtail, mustard, pigweed, ragweed, and crabgrass.

EXAMPLE 1

*Step 1.*—To a solution of 29.8 parts by weight of phenylisocyanate in 100 parts of benzene is added 36.8 parts by weight of monomethylaminoacetaldehyde, diethylacetal. Addition requires eleven minutes and the temperature rises from 24 to 64° C. The reaction solution is refluxed for one hour with stirring. Evaporation of the benzene in vacuo gives a quantitative yield of 5-phenyl-3-methyl-hydantoaldehyde, diethylacetal. It is a yellow viscous oil.

*Step 2.*—A solution of 66 parts by weight of the crude 5-phenyl-3-methylhydantoaldehyde, diethylacetal in 225 parts of ethanol is stirred with 75 parts of aqueous 2 N hydrochloric acid on a steam bath for 2 hours. The yellow solution turns pink in color. The reaction mixture is evaporated to one-half the volume and poured into an equal volume of ice and water. The precipitated solid is collected and washed with n-pentane. This crude product after drying, 27.5 parts by weight, melts at 109–119° C. Recrystallization from 500 parts of water, which includes a Darco treatment of the solution, yields pure 1-phenyl-3-methylimidazolin-2-one. It melts at 119° C., and shows a strong wave length infra-red peak at 6 to 6.1 microns.

*Analysis.*—Calc'd. for $C_{10}H_{10}N_2O$: C, 68.9; H, 5.8. Found: C, 68.7; H, 6.0.

This compound is then formulated into the following pellet herbicidal composition by intimately mixing the compounds with a very small amount of water in a ribbon blender and extruding the resulting paste under high pressure through a 1/16 inch diameter die and cutting the extruded "worms" into 1/8" lengths:

| | Percent |
|---|---|
| 1-phenyl-3-methyl imidazolin-2-one | 25 |
| Anhydrous sodium sulfate | 10 |
| Non-gelling kaolin clay | 65 |

These pellets are applied at a rate of 15 pounds per acre of active ingredients around the base of conifer brush species growing under power lines. Desirable grasses growing adjacent to the treated area show no injury.

EXAMPLE 2

*Step 1.*—A solution of 27.8 parts by weight of p-methoxyphenylisocyanate dissolved in 100 parts of benzene was treated with 29.4 parts of monomethylaminoacetaldehyde, diethylacetal as described in Example 1.

*Step 2.*—The intermediate 5-(p-methoxyphenyl)-3-methylhydantoaldehyde, diethylacetal is treated with 2 N HCl as described in Example 1. 1-(p-methoxyphenyl)-3-methyl-2-imidazolin-2-one is sufficiently soluble in water so it does not precipitate. It is extracted from the reaction mixture with two 75 parts by weight portions of methylene dichloride. The organic solution is treated with Darco and dried over anhydrous $MgSO_4$. Evaporation of the solvent yields the product which is recrystallized from water. It melts at 114° C.

*Analysis.*—Calc'd. for $C_{11}H_{12}N_2O_2$: C, 64.8; H, 5.9. Found: C, 64.4; H, 5.7.

A suitable solution or suspension of this compound is sprayed on a soil plot infested with giant foxtail, begger-tick, mustard and ragweed seeds. At a rate of 3.0 pounds per acre of active ingredient this solution prevents or gives complete kill of these plant species.

This compound is formulated into a wettable powder of the following composition by combining the dry components, blending in a ribbon blender, micropulverizing in a hammer mill until substantially all the product is below 50 microns in particle size and reblending the product in a ribbon blender:

| | Percent |
|---|---|
| 1-(p-methoxyphenyl)-3-methyl imidazolin-2-one | 50 |
| Dry synthetic calcium silicate ("Micro-Cel" 805) | 48 |
| Alkyl aryl sulfonate | 1.75 |
| Methyl cellulose | 0.25 |

When applied post-emergence at a rate of 10 pounds per acre, this composition gives excellent control of weeds such as crabgrass, yellow foxtail, annual ragweed and mustard for an extended period.

EXAMPLE 3

*Step 1.*—A suspension of 32.8 parts by weight of p-(nitrophenyl) isocyanate in 100 parts of benzene is treated with a solution of 29.4 parts by weight of monomethylamino-acetaldehyde, diethylacetal. The reaction is exothermic, the temperature increases during the dropwise addition from 16° to 46° C. The mixture is refluxed for 1 hour. The hot reaction mixture is filtered to remove a little 1,3-bis (p-nitrophenyl) urea. Evaporation of the benzene filtrate yields essentially pure 5-(p-nitrophenyl)-3-methylhydantoaldehyde, diethylacetal. It is a viscous oil.

*Step 2.*—The intermediate oil is treated with 75 parts of 2 N aqueous HCl in 225 parts of ethanol. It is refluxed for 2 hours. The reaction mixture is cooled and the yellow precipitate is collected, washed thoroughly with n-pentane, and air dried. 1-methyl-3-(p-nitrophenyl) imidazolin-2-one, 38 parts by weight, is obtained. It is a yellow crystalline solid which melts at 254° C.

*Analysis.*—Calc'd for $C_{10}H_9N_3O_3$: C, 54.8; H, 4.1. Found: C, 54.5; H, 4.5.

The following oil dispersion herbicidal composition is prepared by grinding the listed ingredients for one hour in a sand mill.

| | Percent |
|---|---|
| 1-methyl-3-(p-nitrophenyl) imidazolin-2-one | 25 |
| Hydrated attapulgite | 3 |
| Alkyl arylpolyether alcohol | 5 |
| Diesel oil | 67 |

This composition is extended with 100 gallons of an herbicidal oil to form a sprayable oil formulation containing 2% by weight of active ingredient. When sprayed from a railroad spray car along a railroad right-of-way at a rate of 16 pounds per acre of the active ingredient excellent control of mixed vegetation containing crabgrass, flower-of-an-hour, ragweed, cockleburr, and lamb's-quarters is obtained.

EXAMPLE 4

*Step 1.*—15 parts by weight of monomethylaminoacetaldehyde, diethylacetal is added dropwise to a solution of 15 parts by weight of p-chlorophenyl isocyanate in 70 parts of n-hexane. The temperature increases from 28 to 50° C. After stirring for one-half hour the mixture was filtered and the filtrate evaporated in vacuo in a steam bath with a water pump. 5-(p-chlorophenyl)-3-methylhydantoaldehyde, diethylacetal, 25 parts by weight, is obtained. It is a viscous oil which does not crystallize, its refractive index is $N_d^{25}$ 1.5314.

*Analysis.*—Calc'd for $C_{14}H_{21}ClN_2O_3$: C, 56.1; H, 7.0; Cl, 11.8. Found: C, 55.5; H, 7.0; Cl, 12.1.

A suitable solution or suspension of this intermediate 5-(p-chlorophenyl)-3-methylhydantoaldehyde, diethylacetal is applied pre-emergence at 4 pounds per acre (active ingredient) to an area around power poles infested with volunteer sweet clover, wild mustard and velvet leaf. Excellent control is obtained.

*Step 2.*—A mixture of 16.5 parts by weight of 5-(p-chlorophenyl) - 3 - methylhydantoaldehyde, diethylacetal, 25 parts of ethanol and 23 parts of 2 N aqueous hydrochloric acid is refluxed for 2 hours. It is cooled and poured into 50 parts of water. The oil is extracted with benzene. The benzene extract is dried over anhydrous $MgSO_4$. Evaporation of the benzene yields 10 parts by weight of crude 1-(p-chlorophenyl)-3-methylimidazolin-2-one. It is crystallized from a 50–50 mixture of ethanol and n-pentane. Pure 1-(p-chlorophenyl)-3-methylimidazolin-2-one is obtained, 3.5 parts by weight. It melts at 128–129° C.

*Analysis.*—Calc'd. for $C_{10}H_9ClNO_2$: C, 57.6; H, 4.4. Found: C, 57.7; H, 4.4.

A suitable solution or suspension of this compound is applied as pre-emergence treatment at the rate of 4 pounds (active) per acre to a fence row infested with yellow foxtail, ryegrass, millet, mustard, pigweed, and black-eyed susan. Excellent control is obtained.

A wettable powder herbicidal composition is prepared as in Example 2 using the following ingredients:

| | Percent |
|---|---|
| 1-(p-chlorophenyl)-3-methyl imidazolin-2-one | 80 |
| Diatomaceous silica | 16.5 |
| Sodium N-methyl-N-oleoyl taurate | 2.5 |
| Sodium-phenol-formaldehyde sulfonate polymer | 1.0 |

When applied at a rate of 1.5 pounds of active ingredient per acre in a total volume of 20 gallons of water per acre as a spray directed to weed seedlings growing in soybeans, the composition gives complete control of crabgrass, giant foxtail, mustard and velvet leaf without visible injury to the crop.

EXAMPLE 5

*Step 1.*—A solution of 29.4 parts by weight of monomethylaminoacetaldehyde, diethylacetal in 25 parts of benzene is added dropwise to a solution of 37.6 parts by weight of 3,4-dichlorophenylisocyanate in 100 parts of benzene. The temperature increases from 18 to 50° C. during the addition. The solution is refluxed for one hour after the addition. Evaporation of the benzene yields a viscous oil, 58.3 parts by weight, $N_d^{25}$ 1.5431. On standing this essentially pure 5-(3,4-dichlorophenyl)-3-methylhydantoaldehyde, diethylacetal solidifies. It melts at 80° C.

*Analysis.*—Calc'd. for $C_{14}H_{20}Cl_2N_2O_3$: C, 50.2; H, 6.0. Found: C, 50.2; H, 6.0.

A suitable solution or suspension of this intermediate 5-(3,4-dichlorophenyl) - 3 - methylhydantoaldehyde, diethylacetal at a rate of 4 pounds per acre (active) is sprayed on an area infested with crabgrass, annual bluegrass, black medic, wild mustard, and butter-and-eggs. These weed species emerge, show extreme chlorosis, and die.

*Step 2.*—A mixture of 20 parts by water of 5-(3,4-dichlorophenyl)-3 - methylhydantoaldehyde, diethylacetal, 75 parts of ethanol and 23 parts of 2 N aqueous hydrochloric acid is refluxed for 2 hours. The mixture is cooled, the precipitate filtered, washed with n-pentane and air dried. Pure 1-(3,4-dichlorophenyl)-3-methyl imidazolin-2-one, 12 parts by weight is obtained. It melts at 163.5–165° C. A solution of a small amount of this product in carbon tetrachloride will decolorize a solution of bromine in carbon tetrachloride.

*Analysis.*—Calc'd. for $C_{10}H_8Cl_2N_2O$: C, 49.5; H, 3.3. Found: C, 49.5; H, 3.4.

A solution of this compound is applied at a rate of 16 pounds per acre in 120 gallons per acre of an acetone solution as an overall spray to seedling willow and red cedar brush. Observations eight weeks after spraying shows complete kill of thee brush species.

A wettable powder herbicidal composition is prepared as described in Example 2 using the following ingredients:

| | Percent |
|---|---|
| 1-(3,4-dichlorophenyl)-3-methyl imidazolin-2-one | 80 |
| Dry attapulgite | 17.25 |
| Alkyl naphthalene sulfonate | 1.75 |
| Lignin sulfonate, sodium salt | 1.0 |

This composition is applied at the rate of 1.5 pounds per acre (active) in 40 gallons of water with a tractor-mounted sprayer. Excellent pre-emergence control of annual broadleaf and grass weeds, such as crabgrass, giant foxtail, pigweed and cocklebur in soybeans is obtained.

This formulation gives excellent pre-emergence control of annual grasses and broadleaves in sugar cane at 3 pounds per acre (active) and asparagus at 2 pounds per acre.

Additional formulation examples of 1-(3,4-dichlorophenyl)-3-methyl imidazolin-2-one:

(A)

| | Percent |
|---|---|
| 1-(3,4-dichlorophenyl)-3-methyl imidazolin-2-one | 30 |
| Hydrated attapulgite | 1.75 |
| $Na_2HPO_4$ | 0.8 |
| Sodium pentachlorophenate | 0.6 |
| Sodium lignin sulfonate | 15.0 |
| Water | 51.85 |

The above composition is mixed together and sand-milled for 30 minutes to yield a stable aqueous suspension which may be diluted with water for spray application.

One pint of this supension is extended with water to a total volume of 30 gallons. The latter suspension is used at a rate of 30 gallons per acre and applied as an over-the-row pre-emergence band treatment (one foot wide) immediately following the planting of cotton. The rows of cotton are four feet wide. Treatment is made with a tractor-mounted sprayer equipped with a boom with drop nozzles. The cotton develops normally and effective annual weed control lasts of several weeks after treatment.

(B)

| | Percent |
|---|---|
| 1-(3,4-dichlorophenyl)-3-methyl imidazolin-2-one | 1 |
| Granular expanded vermiculite | 99 |

The above composition is prepared by dissolving the active ingredient in a volatile solvent and spraying on the vermiculite while tumbling the latter.

Utilizing a conventional lawn spreader, the above composition is broadcast at the rate of 200 pounds per acre to established Bermuda grass turf. Control is obtained of germinated or subsequently germinating weedy annual grasses, including crabgrass and annual bluegrass without adverse effects on the turf.

(C)

| | Percent |
|---|---|
| 1-(3,4-dichlorophenyl)-3-methyl imidazolin-2-one | 20 |
| Alkyl naphthalene sulfonic acid, Na salt | 1.0 |
| Partially desulfonated sodium lignin sulfonate | 1.0 |
| $Na_2HPO_4$ | 0.75 |
| Pigment grade titanium dioxide | 20.00 |
| Kaolin | 57.25 |

The above wettable powder is prepared by blending the components, micropulverizing and reblending.

Twenty pounds (active ingredient) of this formulation is suspended in 80 gallons water and under agitation is applied to weed-infested areas around highway signs at the rate of 20 pounds per acre (active). Complete control of mixed vegetation results for an extended period.

EXAMPLE 6–11

The following 1-(3,4-dichlorophenyl)-3-alkylimidazolin-2-ones are made in accordance with the procedure of Example 5 by substituting the listed amounts of the N-alkylaminoacetal for the 29.4 parts of monomethylaminoacetaldehyde, diethylacetal in Step 1.

| Example No. | Product | N-alkylaminoacetal reactant | Amounts, Parts by Weight |
|---|---|---|---|
| 6 | 1-(3,4-dichlorophenyl)-3-ethylimidazolin-2-one. | N-ethylaminoacetaldehyde, diethylacetal. | 32.2 |
| 7 | 1-(3,4-dichlorophenyl)-3-isopropylimidazolin-2-one. | N-isopropylaminoacetaldehyde, diethylacetal. | 35.0 |
| 8 | 1-tert. butyl-3-(3,4-dichlorophenyl)-imidazolin-2-one. | N-tert. butylaminoacetaldehyde, diethylacetal. | 37.8 |
| 9 | 1-n-butyl-3-(3,4-dichlorophenyl)-imidazolin-2-one. | N-n-butylaminoacetaldehyde, diethylacetal. | 37.8 |
| 10 | 1-(3,4-dichlorophenyl)-3-methylimidazolin-2-one. | N-methylaminoacetaldehyde, dimethylacetal. | 23.8 |
| 11 | 1-(3,4-dichlorophenyl)-3-n-butylimidazolin-2-one. | N-n-butylaminoacetaldehyde, dibutylacetal. | 49.0 |

In the Examples 10 and 11 the two novel intermediates, 5-(3,4-dichlorophenyl)-3-methylhydantoacetaldehyde, dimethyl acetal and 5-(3,4-dichlorophenyl)-3-n-butylhydantoacetaldehyde, dibutylacetal, are low melting solids.

The substituted 3-alkylimidazolin-2-one of Examples 6–9 can be formulated and used as described in Example 5.

EXAMPLES 12–16

The following substituted phenyl-3-methylimidazolin-2-ones, and their intermediate 5-substituted phenyl-3-methylhydantoacetaldehyde, diethylacetals are in accordance with the procedure of Example 3 by substituting the listed amounts of the substituted phenyl isocyanate for the 32.4 parts by weight of the p-nitrophenylisocyanate in Step 1.

| Example No. | Product | Arylisocyanate reactant | Amounts, Parts by Weight |
|---|---|---|---|
| 12 | 1-(m-cyanophenyl)-3-methylimidazolin-2-one. | m-Cyanophenylisocyanate. | 28.8 |
| 13 | 1-(3,4-dibromophenyl)-3-methylimidazolin-2-one. | 3,4-dibromophenyl-isocyanate. | 55.4 |
| 14 | 1-methyl-3-(p-isopropylphenyl) imidazolin-2-one. | p-Isopropylphenyl-isocyanate. | 32.2 |
| 15 | 1-methyl-3-(2,4,5-trichlorophenyl)-imidazolin-2-one. | 2,4,5-trichlorophenyl-isocyanate. | 44.5 |
| 16 | 1-(3-chloro-4-methoxyphenyl)-3-methyl-imidazolin-2-one. | 3-chloro-4-methoxyphenylisocyanate. | 36.1 |

Aqueous dispersions are prepared by vigorously milling the listed ingredients in a sand mill until the average particle size is below 5 microns. The resultant compositions are stable thixotropic suspensions that form relatively stable dilute sprayable compositions upon being extruded with water.

|  | Percent |
|---|---|
| A compound of Examples 12 to 16 above | 30 |
| Hydrated attapulgite | 1.75 |
| Lignin sulfonate, sodium salt | 15 |
| Sodium pentachlorophenate | 0.5 |
| $Na_2HPO_4$ | 0.8 |
| Water | 51.95 |

These compositions are applied at the rate of 20 pounds per acre extended with 80 gallons of water and applied with a hand sprayer to a fence row infested with annual and perennial broadleaves and grasses. Excellent post-emergence weed control is obtained.

Using the techniques of the above examples, the following additional compounds can be prepared and formulated into herbicidal compositions as shown in Examples 1 to 16.

(17) 1-phenyl-3-ethyl imidazolin-2-one
(18) 1-phenyl-3-n-butyl imadozolin-2-one
(19) 1-phenyl-3-t-butyl imidazolin-2-one
(20) 1-s-butyl-3-(p-nitrophenyl)-imidazolin-2-one
(21) 1-(p-butoxyphenyl)-3-n-butyl imidazolin-2-one
(22) 1-methyl-3-(m-tolyl)imidazolin-2-one
(23) 1-(p-tert butylphenyl)-3-n-butyl imidazolin-2-one
(24) 1-(p-cyanophenyl)-3-methyl imidazolin-2-one
(25) 1-(p-cyanophenyl-3-isopropyl imidazolin-2-one
(26) 1-(m-chlorophenyl)-3-methyl imidazolin-2-one
(27) 1-(p-bromophenyl)-3-methyl imidazolin-2-one
(28) 1-(p-iodophenyl)-3-methyl imidazolin-2-one
(29) 1-(p-fluorophenyl)-3-methyl imidazolin-2-one
(30) 1-(p-chlorophenyl)-3-t-butyl imidazolin-2-one
(31) 1-(p-bromophenyl)-3-t-butyl imidazolin-2-one
(32) 1-(3 - chloro-4-isopropylphenyl)-3-methyl imidazolin-2-one
(33) 1-(4-chloro-3-nitrophenyl)-3-methyl imidazolin-2-one
(34) 1-(4-chloro-3-cyanophenyl)-3-methyl imidazolin-2-one
(35) 1-(3-chloro-4-butoxyphenyl)-3-methyl imidazolin-2-one
(36) 1-methyl-3-(2,4,5-tribromophenyl) imidazolin-2-one
(37) 1-methyl-3(3,4,5-trifluorophenyl) imidazolin-2-one This application is a divisional application of copending application Serial No. 62,341, filed October 13, 1960.

What is claimed is:
1. A compound of the formula

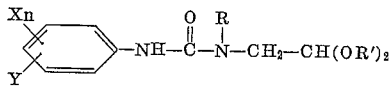

where
X is selected from the group consisting of hydrogen and halogen,
Y is selected from the group consisting of hydrogen, halogen, nitro, cyano, alkyl of less than 5 carbons, and alkoxy of less than 5 carbons,
$n$ is a positive integer from 1 to 2 inclusive, and
R and R′ are alkyl of less than 5 carbons.

2. 5 - (3,4 - dichlorophenyl)-3-methylhydantoaldehyde, diethylacetal.

3. 5 - (3,4 - dichlorophenyl)-3-methylhydantoaldehyde, dimethylacetal.

4. 5-(p-chlorophenyl) - 3 - methylhydantoaldehyde, diethylacetal.

No references cited.